United States Patent
Hall

(10) Patent No.: US 6,525,161 B1
(45) Date of Patent: *Feb. 25, 2003

(54) POWDER COATING COMPOSITIONS AND A METHOD FOR COATING A SUBSTRATE

(75) Inventor: Stephen Anthony Hall, South Giamorgan (GB)

(73) Assignee: Cray Valley Iberica, Sant Celoni (ES)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,079

(22) PCT Filed: Jun. 16, 1995

(86) PCT No.: PCT/EP95/02332
§ 371 (c)(1),
(2), (4) Date: Dec. 20, 1996

(87) PCT Pub. No.: WO95/35332
PCT Pub. Date: Dec. 28, 1995

(30) Foreign Application Priority Data

Jun. 20, 1994 (GB) .............................. 9412346

(51) Int. Cl.$^7$ .............................. C08G 18/30
(52) U.S. Cl. .............................. 528/49; 528/75; 528/53; 528/55; 522/90; 526/301; 427/375; 252/182.18; 560/25; 560/115; 560/118; 560/158
(58) Field of Search .............................. 528/75, 49, 53, 528/55; 522/90; 526/301; 427/375; 252/182.18; 560/25, 115, 118, 158

(56) References Cited

U.S. PATENT DOCUMENTS

| | | | | |
|---|---|---|---|---|
| 4,078,015 A | * | 3/1978 | Leitheiser et al. | 560/25 |
| 4,093,674 A | * | 6/1978 | Brindoepke et al. | 427/506 |
| 4,500,696 A | * | 2/1985 | Gras et al. | 528/45 |
| 5,068,305 A | * | 11/1991 | Meixner et al. | 528/49 |
| 5,089,586 A | * | 2/1992 | Piepho et al. | 528/75 |
| 5,382,619 A | * | 1/1995 | Tahayama et al. | 524/437 |

FOREIGN PATENT DOCUMENTS

| | | | |
|---|---|---|---|
| FR | 2091106 | * | 1/1992 |
| GB | 1443715 | * | 7/1976 |
| GB | 1590413 | * | 6/1981 |
| JP | 62131006 | * | 6/1987 |
| WO | 9319132 | * | 9/1993 |

* cited by examiner

Primary Examiner—Rachel Gorr
(74) Attorney, Agent, or Firm—Michael B. Fein; Cozen O'Connor

(57) ABSTRACT

A powder coating composition comprising a powdered solid ethylenically unsaturated material having a melting point from 60° to 120° C. obtained by reacting a polyisocyanate with an at least stochiometric amount of an alcoholic component comprising: at least a monovalent alcohol, a part of which bears an ethylenic unsaturation derived from acrylic acid or methacrylic acid, and optionally at least a monomeric polyol. This composition is useful for coating substrates.

15 Claims, No Drawings

POWDER COATING COMPOSITIONS AND A METHOD FOR COATING A SUBSTRATE

This invention is concerned with improvements relating to powder coating compositions and methods of coating substrates using such compositions.

Powder coating is a well-established process, basically comprising the application of a powdered fusible material to a substrate, heating of the powder in contact with the substrate to cause the powder to melt and reflow, and cooling the resultant melt to form a solid coating on the substrate. The coating material may simply comprise a film-forming thermoplastic material or may comprise a reactive material, e.g. an epoxy resin together with a curing agent therefore, so that during the course of melting and reflowing reaction occurs to cure the material in situ on the substrate. In any event, powder coating materials are generally such that they have to be melted and reflowed at relatively high temperatures, e.g. 150° C. or more. As a result, powder coating processes are generally not suitable for the coating of heat-sensitive materials such as wood or plastics material. In order to coat such materials, it would be necessary to have a product which had a relatively low melting temperature, e.g. below about 120° C., whilst at the same time being solid at ambient temperature, which material could subsequently be cured in situ on the substrate during the melting/reflowing stage or, afterwards.

U.S. Pat. No. 4,093,674 discloses a thermosetting powder coating composition comprising a solid resin having a Tg from 5° to 150° C. and free hydroxyl groups and a solid polyisocyanate compound, with a molar ratio of isocyanate groups in the latter to active hydrogen in the former of 0.2 to 2. Among examples of the solid resin are the polymers of hydroxyalkylacrylates preferably with Mn from 1,000 to 30,000. This powder coating composition is said to provide advantages over isocyanate crosslinking-type urethane resins wherein all the isocyanate groups are previously blocked with a phenol or an alcohol.

G.B.-A-1,590,413 discloses a urethane resin having at least 2 terminal ethylenically unsaturated groups and comprising the reaction product of at least one isocyanate-functional prepolymer and at least one unsaturated monomer having a single isocyanate-reactive-hydrogen-containing group, said isocyanate-functional prepolymer being the reaction product of (i) at least one diisocyanate and (ii) a mixture of at least 2 polyols (at least 30 mole % being polymeric and at most 70 mole % being monomeric in the said mixture) in an NCO:OH ratio of at least 2.3. This urethane resin is mixed with similar unsaturated materials derived from polymeric polyols, with the unreacted excess of diisocyanate and with a reactive diluent which at the end produces flowable and fluid compositions with viscosities of about 4.5 Pa.s. No mention of powder coating may be found in this document.

U.S. Pat. No. 4,500,696 discloses powder surface coatings comprising polyols and a polyisocyanate component comprising blocked adducts of aliphatic diisocyanates. They involve no unsaturated alcohol.

U.S. Pat. No. 5,089,586 discloses acrylate-free water-dispersible allyl urethanes prepared from a polyglycol or its reaction product with an unsaturated dicarboxylic acid, a hydroxyallyl compound (preferably an allyl ether) and a diisocyanate.

International Application WO-93/19132 discloses mixtures, in a binder composition for powder coatings, of an unsaturated polyester and an oligomer having a plurality of allyl ether groups and having further urethane groups.

EP-A-0 410 242 relates to a powder coating composition which comprises the reaction product of one or more organic polyisocyanates with one or more monovalent alcohols containing (meth)acryloyl groups, and one or more compounds which are free from (meth)acryloyl groups and contain at least two isocyanate-reactive groups.

FR-A-2 091 106 relates to a process for preparing a polymer having C=C double bonds, capable of being polymerized, comprising a polyisocyanate which allows to bind an ester which contains polymerizable C=C double bonds and which has active H, to a matter containing several H.

GB-1 443 715 refers to a copolymerizable fluid composition comprising a photocopolymerizable ethylenically unsaturated liquid monomer, a photosensitizer and a photopolymerizable divinylurethane monomer prepared from xylylene diisocyanate, (meth)acrylic esters having a hydroxyl group and di-, tri-, tetra-, penta- or hexavalent alcohol.

U.S. Pat. No. 4,078,015 concerns a copolymerizable composition including a polymerizable acrylic diurethane and a polymerizable polyacrylic polyurethane which is the reaction product of an organic diisocyanate, a β-hydroxy alkyl ester of an acrylic acid, and a diol.

It has now been found, in accordance with the present invention, that useful solid ethylenically unsaturated materials, having relatively low melting point and suitable for use in powder coating compositions may be prepared by reacting a diisocyanate with one or more monohydric alcohols, optionally in combination with a monomeric polyol such as a dihydric alcohol.

According to one embodiment of the invention, therefore, there is provided a powder coating composition comprising a powdered solid ethylenically unsaturated material having a melting point from about 60° to 120° C. obtained by reacting a polyisocyanate with an at least stoechiometric amount of an alcoholic component comprising at least two monovalent alcohols, some of them bearing an ethylenic unsaturation derived from acrylic acid or methacrylic acid, and optionally at least a monomeric polyol.

Said monomeric polyol can be a dihydric aliphatic alcohol or a dihydric polyalkylene glycol.

In accordance with a preferred embodiment of the invention the polyisocyanate is reacted with an at least stoichiometric amount of :

(i) a monohydric alcohol component, or (ii) a monohydric alcohol component followed by another different monohydric alcohol component, or (iii) a monohydric alcohol component, followed by a dihydric alcohol component, followed by a monohydric alcohol component, or (iv) a dihydric alcohol component, followed by a monohydric alcohol component alone or in admixture with a dihydric alcohol component, the monohydric alcohol component(s) comprising a monohydric aliphatic alcohol or an etherified or esterified dihydric aliphatic alcohol or dihydric polyalkylene glycol, at least a part of which bearing an ethylenic unsaturation derived from acrylic acid or methacrylic acid and the dihydric alcohol component comprising a dihydric aliphatic alcohol or a dihydric polyalkylene glycol and being preferably used in an amount not more than 50%, preferably not more than 25%, of the stoichiometric amount of hydroxyl groups required to react with the isocyanate groups on the polyisocyanate.

As noted above, it is a requirement of the present invention that the material obtained (hereinafter simply referred to as an "oligourethane", "urethane acrylate" or "oligomer") have a melting point of from 60 to 120° C. (the term "melting point" as used herein means the melting point as determined by the ring and ball method).

It is also most often preferred that the powdered solid material of the invention have a viscosity in the range from 0.1 Pa.s to 2.5 Pa.s.

Suitable polyisocyanates for use in the preparation of the oligourehanes include toluene diisocyanate, diphenylmethane-4,4'-diisocyanate, hexamethylene-1,6-diisocyanate, napthylene-1,5-diisocyanate, 3,3,'-dimethoxy-4,4,'-biphenyldiisocyanate, 3,3'-dimethyl-4,4,'-biphenyldiisocyanatei phenylene diisocyanate, 4,4'-biphenyldiisocyanate, isophorone diisocyanate, trimethylhexamethylene diisocyanate and tetramethylene xylene diisocyanate.

A wide variety of monohydric aliphatic alcohols may be used to produce the oligourethanes, e.g. $C_1$ to $C_{22}$ alcohols. Typical etherified dihydric alcoholic materials which may be used as monohydric alcoholic component include propylene glycol methyl ether, dipropylene glycol methyl ether, ethylene glycol butyl ether, diethylene glycol butyl ether, tripropylene glycol butyl ether and propylene glycol phenyl ether. Dihydric alcohols which may be used include, for example, saturated aliphatic diols such as ethylene glycol, diethylene glycol, triethylene glycol, propylene glycol, dipropylene glycol, tripropylene glycol, butylene glycols, neopentyl glycol, 1,3- and 1,4-butane diols, 1,5-pentane diol, 1,6-hexanediol, 2-methyl-1,3 propanediol, glycerol, and 1,1,1-trimethylolpropane.

The reaction between the polyisocyanate and the monohydric/dihydric alcohol component is suitably carried out in the presence of a catalyst. As such a catalyst the following may be mentioned :

(a) tertiary amines such as bis(dimethyl amino ethyl)ether, trimethyl amine, triethyl amine, N-methyl morpholine, N-ethyl morpholine, N,N-dimethyl benzylamine, N,N-dimethyl ethanol amine, N,N,N',N'-tetramethyl-1,3-butane diamine, triethylanol amine, 1,4-diazabicyclo (2.2.2.)octane and pyridine oxide, (b) tertiary phosphines such as trialkyl phosphines and dialkyl benzyl phosphines, (c) strong bases such as the hydroxides, alcoholates and phenolates of alkali metals and alkaline earth metals, (d) metal salts of strong acids such as ferric chloride, stannic chloride and bismuth chloride, antimony trichloride and bismuth nitrate, (e) chelates, such as those which can be obtained from acetyl acetone, benzoyl acetone, trifluoroacetyl acetone, ethyl acetoacetate, salicylaldehyde, cyclopentanone-2-carboxylate, acetyl acetoimine, bis-acetyl acetone alkylene diimines, salicylaldehyde imine, and from metals such as beryllium, magnesium, zinc, cadmium, lead, titanium, zirconium, tin, arsenic, bismuth, chromium, molybdenum, manganese, iron, cobalt and nickel, (f) alcoholates and phenolates of metals, such as $Ti(OR)_4$, $Sn(OR)_4$, $Sn(OR)_2$ and $Al(OR)_3$, in which R is an alkyl or aryl group, (g) the salts of organic acids and of metals, such as alkali metals and alkaline earth metals, aluminium, tin, lead, manganese, cobalt, nickel and copper, for example sodium acetate, potassium laurate, calcium hexanoate, stannous acetate, stannous octoate and stannous oleate, lead octoate, manganese and cobalt napthenates, and (h) iron and cobalt metal carbonyls and organometallic derivatives of tetravalent tin, of trivalent and pentavalent arsenic, of antimony and of bismuth ; particularly preferred are the salts of dialkyl tin carboxylic acids, such as dibutyl tin diacetate, dibutyl tin dilaurate, dibutyl tin maleate, dilauryl tin diacetate, dioctyl tin diacetate, dibutyl tin bis(4-methylamino benzoate), dibutyl tin bis(6-methylamino caproate), trialkyl tin hydroxides, dialkyl tin oxides, dialkyl tin dialcoxides and dialkyl tin dichlorides.

Said catalyst is generally used at a rate of from 0.01 to 2% by weight of the polyisocyanate.

The molecular weight of the final solid, ethylenically unsaturated material is suitably from 500 to 3,000, preferably from 500 to 1,500.

For some applications it is desirable that the oligourethanes be clear. It is not possible to predict whether any particular oligourethane produced in accordance with the invention will, or will not, have the desired optical properties in this respect. However, here again it is a matter of simple routine trial and experiment.

The ethylenically unsaturated solid material forming a part of the powder coating composition in accordance with the invention is in powdered form, e.g. has an average particle size from 10 to 250 $\mu$m, especially from 10 to 90 $\mu$m. In addition to the particulate, ethylenically unsaturated material, a powder coating composition in accordance with the invention preferably further comprises a curing system for the ethylenically unsaturated material.

In accordance with one embodiment of the invention, the curing system may comprise a thermally initiated free radical-generating catalyst, of the peroxide type or like, optionally together with one or more promoters therefore. Suitable examples of such free radical-generating catalysts include 1,1-bis(t-butylperoxy)-3,5,5-trimethylcyclohexane, 1,1-bis(t-butylperoxy)-cyclohexane, t-butylperoxy-isopropyl carbonate, t-butyl perisononanoate, t-butyl peracetate, t-butyl perbenzoate, dicumyl peroxide, di-t-butyl peroxide, t-butyl hydroperoxide, t-butyl perneodecanoate, diisooctanoyl peroxide, dibenzoyl peroxide, and azo bis (isobutyronitrile).

Preferably, the catalyst system is selected so that the powder can melt and reflow prior to curing. This makes it possible to obtain a level film, in contrast to conventional epoxy/acid powders in which curing is effected during melting and reflowing, leading to an orange peel effect.

In accordance with another embodiment of the invention, the curing system may further comprise one or more photoinitiators, sensitive to ultraviolet light, optionally together with sensitizers therefore. By operating with such a system, the coating composition may be allowed to cool and solidify after melting/reflowing and then be subjected to appropriate irradiation to cure the coating.

Examples of suitable photoinitiators include benzyldimethyl ketal, trimethylbenzophenone, isopropylthioxanthone, ethyl 4-dimethylamino benzoate, benzophenone, 2-chloro and 2-ethyl-thioxanthone, 2,2-dimethoxy-2-phenylacetophenone, 2,2-diethoxyaceto-phenone, 2-hydroxy-2-methyl-1-phenyl-propanone, 4-benzoyl-4'-methyl-diphenyl sulphide, 1-hydroxycyclohexyl-acetophenone, and 2-ethyl-hydroquinone.

Examples of suitable sensitizers include 4,4-dimethylamino-benzophenone, triethanolamine, N-methyl-diethanolamine, 2-(butoxy)ethyl, 4-dimethylamino benzoate and acrylated amines.

In accordance with another embodiment of the invention, the curing system may be absent and curing of the solidified coating on the substrate may be effected by electron beam.

In addition to the basic components noted above, powder coating compositions in accordance with the invention may, and often do, contain at least one other ingredient particularly selected from colorants such as pigments or dyestuffs, flow aids, anti-cissing agents, flexibilizers, degassing agents and inorganic fillers.

The invention also provides a powder coating process for coating a substrate which comprises applying a powder coating composition in accordance with the invention to the substrate, heating the composition to melt and reflow it on the substrate, and allowing the composition to cool on the substrate. In the case of the first embodiment of the invention discussed above, curing of the coating will preferably be effected by free radical polymerisation after the melting/reflowing step, whereas in the second embodiment of the invention an additional curing step is required that is the substrate bearing the cured coating must be subjected to ultraviolet or electron beam radiation.

In order that the invention may be well understood the following examples are given by way of illustration only. Unless stated otherwise, all amounts are expressed by weight.

EXAMPLE 1

250 g of diphenyl methane-4,4'-diisocyanate and 0.1 g of dibutyl tin dilaurate were charged to a 1 litre round bottomed flask fitted with a thermometer, air sparge and an addition funnel. The contents were heated to 45° C. and 37 g of dipropylene glycol methylether were added and the temperature allowed to rise to 60° C. Then 67.5 g of octadecanol was charged and the temperature raised to 110° C., at which temperature 0.5 g of hydroquinone was added. An air sparge was set at 1.51 /hour and bubbled through the material while 116 g of hydroxyethyl acrylate was added over 1 hour while maintaining the batch temperature at 110° C. until the isocyanate value falls below 30 mgKOH/g. Then 33.5 g of dipropylene glycol was charged and the batch temperature raised to 120° C. and held until the NCO value is lower than 30 ppm. The urethane acrylate was then discharged and allowed to cool. It was found that the material produced was a very hard solid with a melting point of 101° C. and had a extremely low viscosity of only 0.1 Pa.s at 125° C. This material is called Resin B.

Resin B was extruded with 0.5% of a thermal initiator benzoyl peroxide and 2% of Modaflow®, at a screw speed of 200 rpm giving a residence time in the extruder of about 10 seconds. The temperature was maintained between 110 and 115° C. with the wall temperature between 120 and 125° C. The final product has a gel time of 3.5 minutes at 110° C. The resultant material was then ground and classified to less than 90 μm and electrostatically applied to a chromated aluminium test panel. The panel was then reflowed and cured in a fan assisted oven at 120° C. for 10 minutes to yield a film with a Koenig hardness of 80% and a methyl ethyl ketone swab resistance of more than 200 rubs.

What is claimed is:

1. A powder coating composition comprising a powdered solid ethylenically unsaturated material having a melting point from 60° to 120° C. and an average particle size from 10 to 250 μm which can melt and reflow prior to curing obtained by reacting in bulk in a molten state a polyisocyanate with an at least stoichiometric amount of an alcoholic component comprising: monohydric alcohol component with an ethylenic unsaturation derived from acrylic acid or methacrylic acid; saturated monohydric alcohol and a monomeric polyol, said monomeric polyol being present in an amount not more than 50% of the stoichiometric amount of hydroxyl groups required to react with the isocyanate groups of the polyisocyanate.

2. A powder coating composition according to claim 1, characterized in that said saturated monohydric alcohol is selected from the group consisting of aliphatic alcohol, etherified dihydric aliphatic alcohol, esterified dihydric aliphatic alcohol, etherified dihydric polyalkylene glycol, and esterfied dihydric polyalkylene glycol.

3. A powder coating composition according to claim 2, characterized in that said monohydric alcohol is selected from the group consisting of $C_1$ to $C_{22}$ monohydric aliphatic alcohols, propylene glycol methyl ether, dipropylene glycol methyl ether, ethylene glycol butyl ether, diethylene glycol butyl ether, tripropylene glycol butyl ether and propylene glycol phenyl ether.

4. A powder coating composition according to claim 1, characterized in that said monomeric polyol is selected from the group consisting of dihydric aliphatic alcohol and dihydric polyalkylene glycol.

5. A powder coating composition according to claim 4, characterized in that said monomeric polyol is selected from the group consisting of ethylene glycol, diethylene glycol, triethylene glycol, propylene glycol, dipropylene glycol, tripropylene glycol, butylene glycols, neopentyl glycol, 1,3- and 1,4-butane diols, 1,5-pentane diol, 1,6-hexanediol, 2-methyl-1,3-propanediol, glycerol and 1,1,1-trimethylolpropane.

6. A powder coating composition according to claim 1, characterized in that said monomeric polyol is present in an amount not more than 25% of the stoichiometric amount of hydroxyl groups required to react with the isocyanate groups of the polyisocyanate.

7. A powder coating composition according to claim 1, characterized in that said polyisocyanate is selected from the group consisting of toluene diisocyanate, diphenylmethane-4,4'-diisocyanate, hexamethylene-1,6diisocyanate, naphthylene-1,5-diisocyanate, 3,3'-dimethoxy-4,4'-biphenyldiisocyanate, 3,3'dimethyl-4,4'-biphenyldiisocyanate, phenylene diisocyanate, 4,4'-biphenyldiisocyanate, isophorone diisocyanate, trimethyl-hexamethylene diisocyanate and tetramethylene xylene diisocyanate.

8. A powder coating composition according to claim 1, characterized in that the reaction of the polyisocyanate with the alcoholic component is carried out in the presence of a catalyst selected from tertiary amines, tertiary phosphines, strong bases, metal salts of strong acids, chelates, metal alcoholates and metal phenolates, metal salts of organic acids, iron and cobalt carbonyls, and organometallic derivatives of tetravalent tin, of trivalent and pentavalent arsenic, antimony and bismuth.

9. A powder coating composition comprising a powdered solid ethylenically unsaturated material having a melting point from 60° to 120° C. and an average particle size from 10 to 250 μm which can melt and reflow prior to curing obtained by reacting in bulk in a molten state a polyisocyanate with an at least stoichiometric amount of an alcoholic component comprising: monohydric alcohol component with an ethlenic unstauration derived from acrylic acid or methacrylic acid: saturated monohydric alcohol and a monomeric polyol, said monomeric polyol being present in an amount not more than 50% of the stoichiometric amount of hydroxyl groups required to react with the isocyanate groups of the polyisocyanate and wherein the molecular weight of the solid ethylenically unsaturated material is from 500 to 3,000.

10. A powder coating composition according to claim 1, characterized in that it further comprises a curing system for the ethylenically unsaturated material.

11. A powder coating composition according to claim 10, characterized in that the curing system comprises a thermally initiated free-radical generating catalyst.

12. A powder coating composition according to claim 11, characterized in that the curing system comprises a photo-initiator sensitive to ultraviolet light.

13. A powder coating composition according to claim 12, characterized in that the curing system further comprises a sensitizer.

14. A powder coating composition according to claim 1, characterized in that it further comprises at least one other ingredient selected from pigments, dyestuffs, flow aids and inorganic fillers.

15. A method of coating a substrate which comprises applying a coating composition according to any of claims 1, 2, to 5, 6 to 9 and 10 to 14 to the substrate, heating the composition to melt and reflow it on the substrate, and allowing the composition to cool on the substrate.

* * * * *